US011026202B2

(12) United States Patent
Gazit

(10) Patent No.: US 11,026,202 B2
(45) Date of Patent: Jun. 1, 2021

(54) METHOD AND SYSTEM FOR SYNCHRONIZING A MESH NETWORK

(71) Applicant: Connected Intelligence Systems LTD., Netanya (IL)

(72) Inventor: Ido Gazit, Netanya (IL)

(73) Assignee: CONNECTED INTELLIGENCE SYSTEMS LTD., Netanya (IL)

( * ) Notice: Subject to any disclaimer, the term of this patent is extended or adjusted under 35 U.S.C. 154(b) by 0 days.

(21) Appl. No.: 16/978,864

(22) PCT Filed: Mar. 7, 2019

(86) PCT No.: PCT/IL2019/050254
§ 371 (c)(1),
(2) Date: Sep. 8, 2020

(87) PCT Pub. No.: WO2019/171383
PCT Pub. Date: Sep. 12, 2019

(65) Prior Publication Data
US 2020/0413361 A1    Dec. 31, 2020

(30) Foreign Application Priority Data
Mar. 8, 2018  (IL) .......................................... 257997

(51) Int. Cl.
*H04W 56/00*    (2009.01)
*H04W 84/18*    (2009.01)

(52) U.S. Cl.
CPC ........ *H04W 56/0025* (2013.01); *H04W 84/18* (2013.01)

(58) Field of Classification Search
CPC ............... H04W 24/02; H04W 56/001; H04W 56/0015; H04W 56/0025; H04W 56/003;
(Continued)

(56) References Cited

U.S. PATENT DOCUMENTS 7,221,686 B1 * 5/2007 Belcea .................. H04J 3/0667
370/350
7,675,863 B2 * 3/2010 Werb ...................... H04L 9/083
370/241
(Continued)

FOREIGN PATENT DOCUMENTS

CN    102355319    12/2012
CN    103457685    12/2013
(Continued)

OTHER PUBLICATIONS

International Search Report for PCT Application No. PCT/IL2019/050254, dated May 7, 2019.
(Continued)

*Primary Examiner* — Ahmed Elallam
(74) *Attorney, Agent, or Firm* — Pearl Cohen Zedek Latzer Baratz LLP

(57) ABSTRACT

A system and method of synchronizing a mesh network comprising a plurality of nodes are provided. The method may include sensing and transmitting, by a first subset of the plurality nodes, temperature values of the first subset nodes; receiving, by at least one back-end unit, from the first subset nodes, the temperature values of the first subset nodes; determining, by the at least one back-end unit, for a second subset of the plurality of nodes including all the first subset nodes, respective ambient-related clock drift values, based on the temperature values of the first subset nodes and an inter-node data; transmitting, by the at least one back-end unit, the respective ambient-related clock drift values to the second subset nodes; and determining, by the second subset nodes, ambient-related time offset values between each respective two nodes of the second subset, based on the respective nodes' ambient-related clock drift values.

18 Claims, 13 Drawing Sheets

(58) Field of Classification Search
CPC ... H04W 56/002; H04W 84/18; H04W 92/10; H04J 3/0667; H04J 3/0638; G01K 3/10; Y02D 30/70

See application file for complete search history.

(56) References Cited

U.S. PATENT DOCUMENTS

| | | | | |
|---|---|---|---|---|
| 7,986,270 | B2* | 7/2011 | Heidari-Bateni | G01S 13/767 |
| | | | | 342/387 |
| 8,194,636 | B1 | 6/2012 | Doherty et al. | |
| 8,351,409 | B2* | 1/2013 | Albert | H04W 56/002 |
| | | | | 370/338 |
| 9,226,252 | B2* | 12/2015 | Akhlaq | H04W 56/001 |
| 9,226,253 | B2* | 12/2015 | Guo | H04W 56/0075 |
| 9,602,270 | B2 | 3/2017 | Hartman | |
| 9,693,325 | B1* | 6/2017 | Park | H04W 4/70 |
| 10,833,840 | B2* | 11/2020 | Kratz | H04W 56/0015 |
| 10,849,086 | B2* | 11/2020 | Poorrezaei | H04W 56/0075 |
| 2006/0187866 | A1* | 8/2006 | Werb | G01D 4/004 |
| | | | | 370/311 |
| 2011/0249688 | A1 | 10/2011 | Liu et al. | |
| 2011/0299472 | A1 | 12/2011 | Kumar | |
| 2015/0025831 | A1* | 1/2015 | Mourey | G01V 1/003 |
| | | | | 702/130 |
| 2015/0173033 | A1 | 6/2015 | Wu et al. | |
| 2015/0189611 | A1 | 7/2015 | Charles et al. | |
| 2019/0028986 | A1* | 1/2019 | Poorrezaei | H04J 3/0664 |
| 2019/0246367 | A1* | 8/2019 | Vilajosana Guillen | |
| | | | | H04W 56/0015 |

FOREIGN PATENT DOCUMENTS

| | | |
|---|---|---|
| CN | 104158647 | 11/2014 |
| EP | 2587872 | 5/2013 |
| WO | WO 2005/010214 | 2/2005 |
| WO | WO 2006/069067 | 6/2006 |
| WO | WO 2018/014970 | 1/2018 |

OTHER PUBLICATIONS

Stanislowski et al. "Adaptive Synchronization in IEEE802.15.4e Networks"; IEEE Transactions on Industrial Informatics, 10 (1), 795-802, Feb. 2014.

Extended European Search Report for EP Patent Application No. 19763467.8 dated Mar. 31, 2021.

* cited by examiner

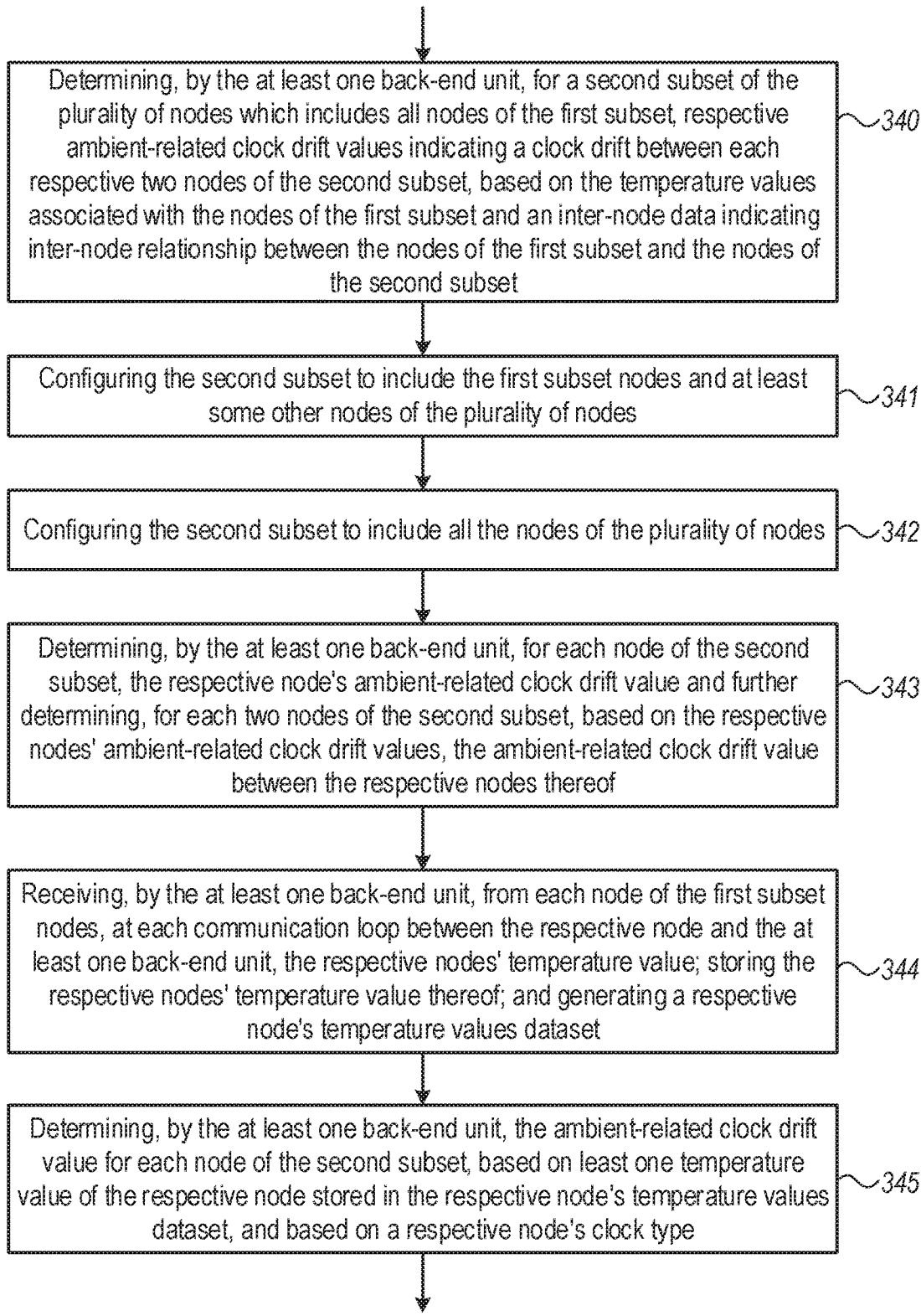
Figure 4 (cont. 1)

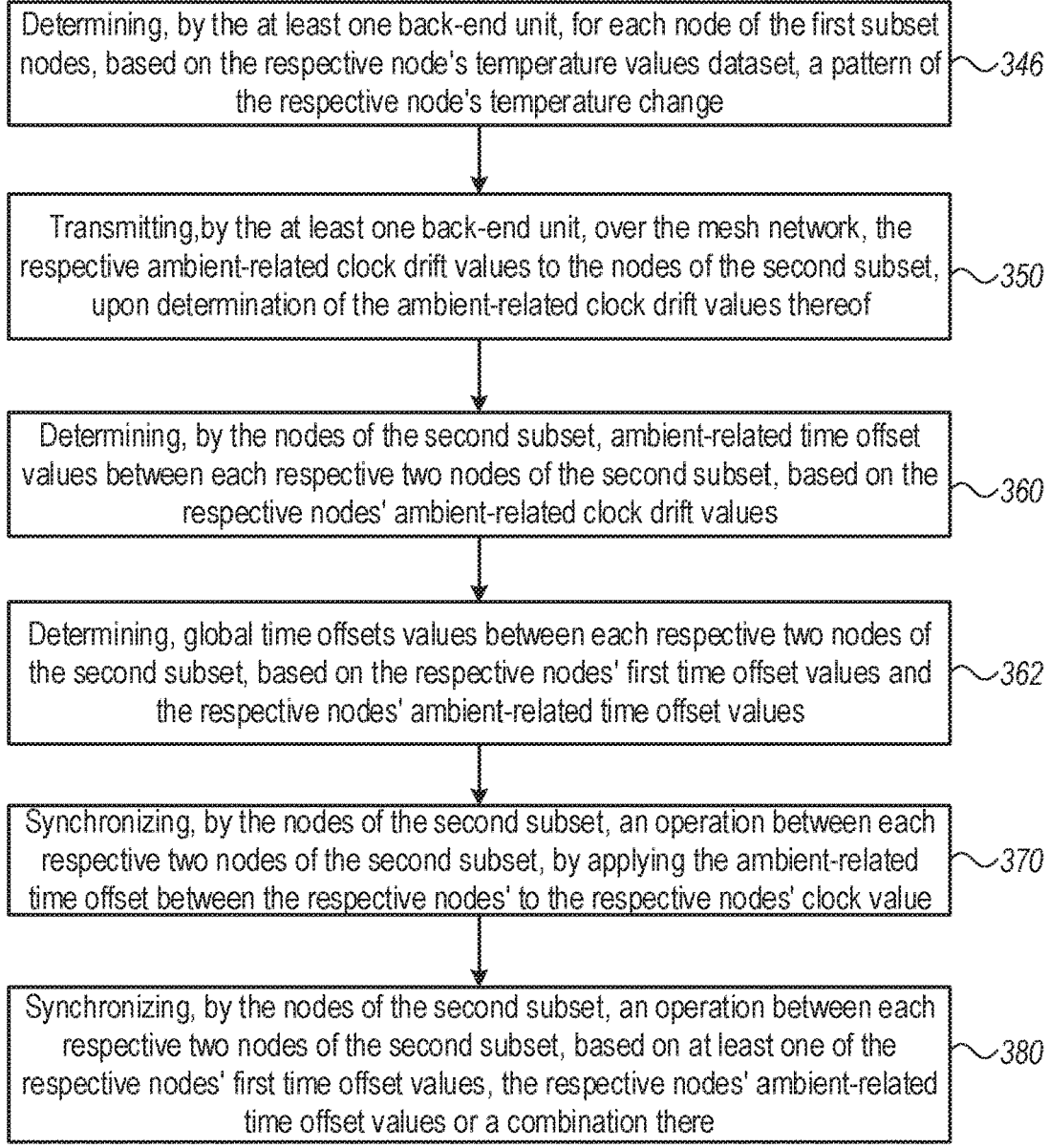
Figure 4 (cont. 2)

METHOD AND SYSTEM FOR SYNCHRONIZING A MESH NETWORK

CROSS-REFERENCE TO RELATED APPLICATIONS

This application is a National Phase Application of PCT International Application No. PCT/IL2019/050254, International Filing Date Mar. 7, 2019, entitled: "METHOD AND SYSTEM FOR SYNCHRONIZING A MESH NETWORK", Published on Sep. 12, 2019 under PCT International Application Publication No. WO 2019/171383 which claims the priority of Israel Patent Application No. 257997, filed Mar. 8, 2018, which is hereby incorporated by reference in its entirety.

FIELD OF THE INVENTION

The present invention relates to the field of mesh networks, and more particularly, to methods of synchronizing mesh networks.

BACKGROUND OF THE INVENTION

Mesh networks (e.g., wireless sensors networks) are widely used these days in various military and/or industrial applications. For example, mesh networks may be used in health care monitoring, earth sensing, gas leak detection and/or water quality monitoring. Some mesh networks may include, for example, few nodes or tens of nodes, while other mesh networks may include, for example, thousands of nodes. Mesh network nodes may share information with each other or may use each other to transfer data along a predetermined path (e.g., that may include specific nodes only) to a destination (e.g., a target node and/or a back-end unit). Typically, mesh network nodes do not have access to electrical infrastructure and are powered by, for example, a battery. Mesh network nodes are typically required to operate for a long time (e.g., for years).

Typically, each node in the mesh network has a first clock drift with respect to remaining nodes in the network. The first clock drift between two respective nodes may be due to, for example, respective nodes internal clocks' inaccuracies and/or due to different environmental conditions being experiences by the respective nodes (e.g., different temperature values). As a result, mesh networks typically require frequent synchronization procedures to thereby enable the nodes to operate in a synchronized manner. However, the synchronization procedures thereof are typically expensive in the mean of power consumption and/or network resources.

SUMMARY OF THE INVENTION

One aspect of the present invention provides a system for synchronizing a mesh network. The system may include: a plurality of interconnected nodes forming a mesh network, wherein the nodes are each associated with a respective clock value, and wherein a first subset of the plurality of nodes is arranged to sense and transmit, over the mesh network, temperature values associated with the nodes of the first subset; and at least one back-end unit arranged to: receive, over the mesh network, the temperature values associated with the nodes of the first subset; calculate, for a second subset of the plurality of nodes which includes at least some nodes of the first subset, respective ambient-related clock drift values indicating a clock drift between each respective two nodes of the second subset, based on the temperature values associated with the nodes of the first subset and an inter-node data indicating inter-node relationship between the nodes of the first subset and the nodes of the second subset; and transmit the respective ambient-related clock drift values, over the mesh network, to the nodes of the second subset, wherein the nodes of the second subset are arranged to determine ambient-related time offset values between each respective two nodes of the second subset, based on the respective nodes' ambient-related clock drift values.

In some embodiments, the nodes of the second subset are arranged to synchronize an operation between each respective two nodes of the second subset, by applying the ambient-related time offset between the respective nodes' to the respective nodes' clock value.

In some embodiments, the nodes of the second subset are arranged to determine first clock drift values between each respective two nodes of the second subset, and further arranged to determine, based on the respective nodes' first clock drift values, first time offset values between each respective two nodes of the second subset.

In some embodiments, the nodes of the second subset are arranged to synchronize the operation between each respective two nodes of the second subset, based on at least one of the respective nodes' first time offset values, the respective nodes' ambient-related time offset values or a combination thereof.

In some embodiments, the second subset further comprises at least some other nodes of the plurality of nodes.

In some embodiments, the second subset comprises all nodes of the plurality of nodes.

In some embodiments, the first subset comprises all nodes of the plurality of nodes.

In some embodiments, each node of the plurality of nodes directly communicates with each other node of the plurality of nodes.

In some embodiments, each node of the plurality of nodes directly communicates with some other nodes of the plurality of nodes and further indirectly communicates with remaining nodes of the plurality of nodes.

In some embodiments, each node of the plurality of nodes directly communicates with at least one back-end unit of the at least one back-end unit.

In some embodiments, some nodes of the plurality of nodes directly communicate with at least one back-end unit of the at least one back-end unit and wherein some other nodes of the plurality of nodes indirectly communicate with at least one back-end unit of the at least one back-end unit.

Another aspect of the present invention provides a method of synchronizing a mesh network comprising a plurality of nodes, the method comprising: sensing and transmitting, by a first subset of the plurality nodes, over the mesh network, temperature values associated with the nodes of the first subset; receiving, by at least one back-end unit, over the mesh network, from the nodes of the first subset, the temperature values associated with the nodes of the first subset; determining, by the at least one back-end unit, for a second subset of the plurality of nodes which includes at least some nodes of the first subset, respective ambient-related clock drift values indicating a clock drift between each respective two nodes of the second subset, based on the temperature values associated with the nodes of the first subset and an inter-node data indicating inter-node relationship between the nodes of the first subset and the nodes of the second subset; transmitting, by the at least one back-end unit, over the mesh network, the respective ambient-related clock drift values to the nodes of the second subset; and determining, by the nodes of the second subset, ambient-related time offset values between each respective two nodes of the second subset, based on the respective nodes' ambient-related clock drift values.

In some embodiments, the method further includes synchronizing, by the nodes of the second subset, an operation between each respective two nodes of the second subset, by applying the ambient-related time offset between the respective nodes' to the respective nodes' clock value.

In some embodiments, the method further includes determining, by the nodes of the second subset, first clock drift values between each respective two nodes of the second subset, and further determining, based on the respective nodes' first clock drift values, first time offset values between each respective two nodes of the second subset.

In some embodiments, the method further includes synchronizing, by the nodes of the second subset, an operation between each respective two nodes of the second subset, based on at least one of the respective nodes' first time offset values, the respective nodes' ambient-related time offset values or a combination thereof.

In some embodiments, the method further includes configuring second subset to further comprise at least some other nodes of the plurality of nodes.

In some embodiments, the method further includes configuring the second subset to comprise all nodes of the plurality of nodes.

In some embodiments, the method further includes configuring the first subset to comprise all nodes of the plurality of nodes.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
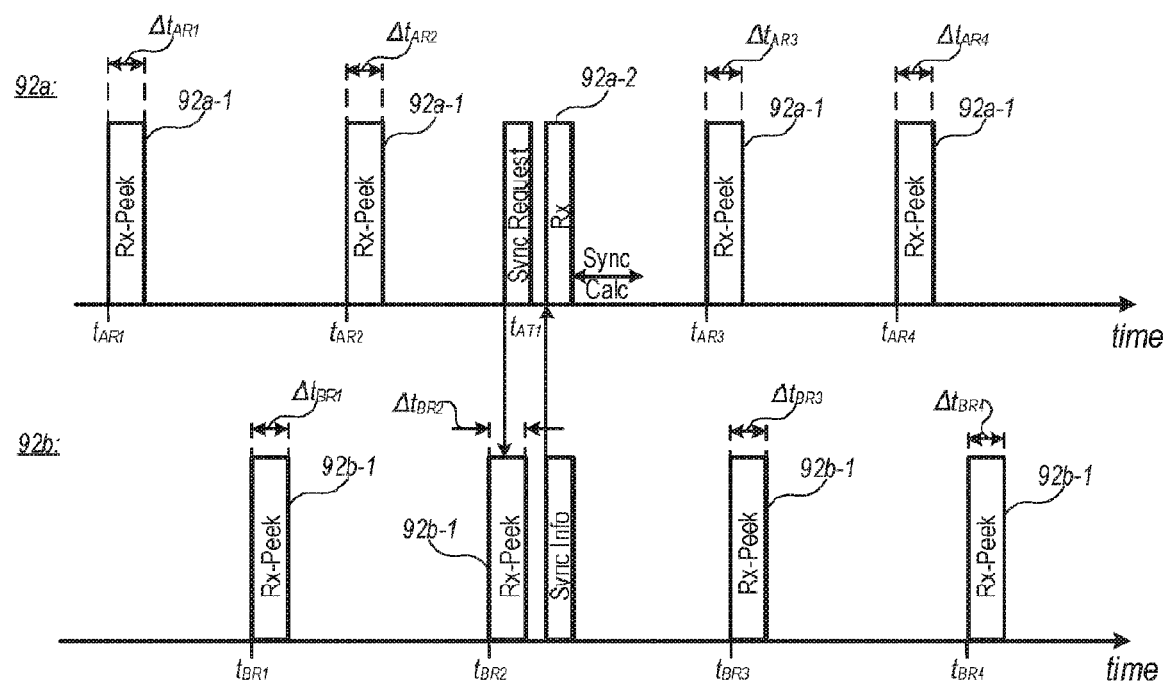
FIG. 1A and FIG. 1B are graphs illustrating functions performed by two nodes of a mesh network to synchronize an operation between the nodes thereof, and a synchronization failure due to a first clock drift between the nodes, respectively, according to prior art.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Prior to the detailed description being set forth, it may be helpful to set forth definitions of certain terms that will be used hereinafter. The term "all nodes" as used in this application must not be understood as a limiting term and should be understood as referring to "some nodes" instead.

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein.

Furthermore, well known features can have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, systems and methods of synchronizing a mesh network including a plurality of nodes are provided. The system may be arranged to determine first clock drift values (e.g., due to nodes' clocks inaccuracies) between each respective two nodes of the mesh network, for example during a setup of the mesh network, and further to synchronize an operation between each respective two nodes of the mesh network based on respective nodes' first clock drift values. However, the first clock drift values thereof may, in some embodiments, depend on, for example, temperature values of the mesh network nodes. As a result, synchronization maintenance is required to ensure a synchronized operation of the mesh network. Current mesh networks are typically arranged to periodically update the first clock drift values to thereby maintain the synchronization between each respective two nodes of the mesh network. However, these updates are expensive in means of power consumption and/or network resources. In contrast, the disclosed system may be arranged to determine ambient-related clock drift values (e.g., temperature-related clock drift values) between each respective two nodes of the mesh network and further synchronize the operation between each respective two nodes of the mesh network based on the respective nodes' ambient-related clock drift values thereof. As a result, the system may enable reducing to null the number of repeated first clock drift values updates, thereby significantly reducing the power being consumed by the mesh network nodes as compared to current mesh networks.

Figure 1B:
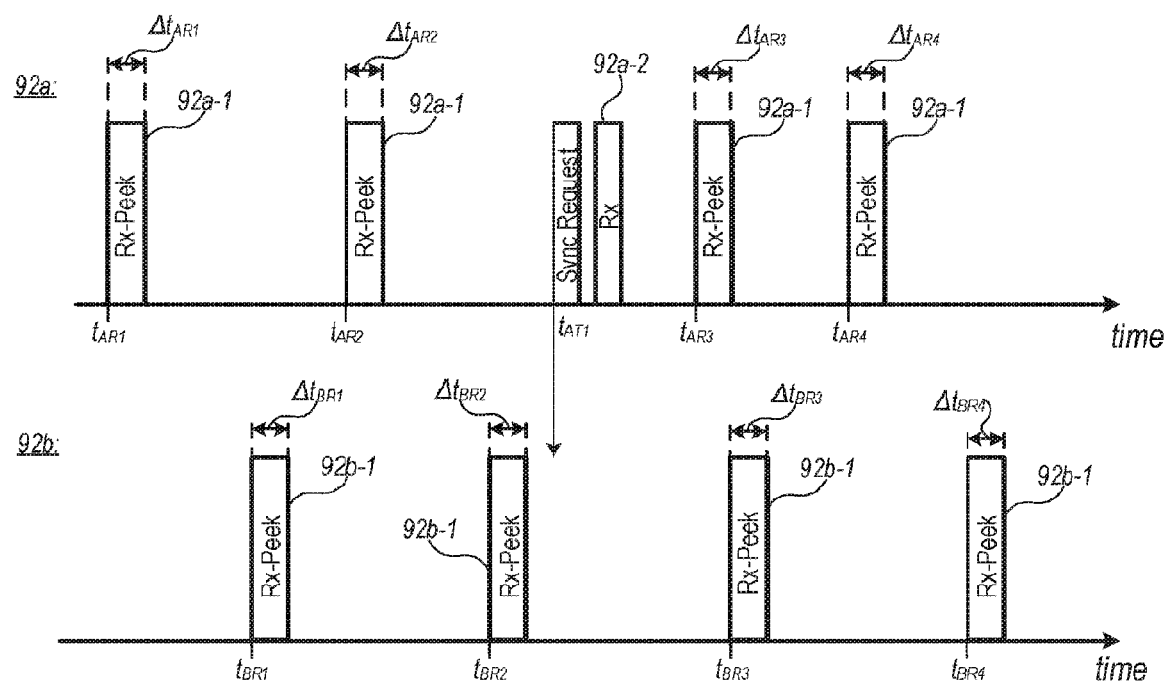

Reference is now made to FIG. 1A and FIG. 1B, which are graphs illustrating functions performed by two nodes 92a, 92b of a mesh network to synchronize an operation between the nodes thereof, and a synchronization failure due to a first clock drift between nodes 92a, 92b, respectively, according to prior art. It is noted that functions illustrated in FIGS. 1A-1B may be performed between each two nodes of the mesh network.

Typically, mesh network nodes, e.g., node 92a and node 92b, are in a sleep mode when no communication with other nodes and/or with a back-end unit of the network is required. In order to, for example, receive data from another node and/or from the back-end unit of the mesh network, each node in the network should activate a respective node's receiver (or a transceiver) at a predetermined receiving time point and for a predetermined receiving time duration.

The activations of node's 92a receiver are indicated in FIGS. 1A-1B as "RX-Peeks" 92a-1 at corresponding predetermined receiving time points $t_{AR1}$, $t_{AR2}$, $t_{AR3}$, $t_{AR4}$ and having corresponding predetermined receiving time durations $\Delta t_{AR1}$, $\Delta t_{AR2}$, $\Delta t_{AR3}$, $\Delta t_{AR4}$, respectively. The activations of node's 92b receiver are indicated in FIGS. 1A-1B as "RX-Peeks" 92b-1 at corresponding predetermined receiving time points $t_{BR1}$, $t_{BR2}$, $t_{BR3}$, $t_{BR4}$ and having corresponding predetermined receiving time durations $\Delta t_{BR1}$, $\Delta t_{BR2}$, $\Delta t_{BR3}$, $\Delta t_{BR4}$, respectively.

Node 92a may include information regarding the predetermined receiving time points $t_{BR1}$, $t_{BR2}$, $t_{BR3}$, $t_{BR4}$ and the corresponding predetermined receiving time duration $\Delta t_{BR1}$, $\Delta t_{BR2}$, $\Delta t_{BR3}$, $\Delta t_{BR4}$ of node 92b (e.g., as shown in FIG. 1A). Node 92a may determine, for example based on the predetermined receiving time point $t_{BR2}$ and the corresponding predetermined receiving time duration $\Delta t_{BR2}$ of node 92b, a first transmitting point $t_{AT1}$ to transmit a sync request to node 92b (e.g., as shown in FIG. 1A).

Node 92b may receive the sync request from node 92a and may further transmit a sync information to node 92a (e.g., as shown in FIG. 1A). The sync information may include, for example, predetermined receiving time point $t_{BR3}$ and/or $t_{BR4}$ and the corresponding predetermined receiving time duration $\Delta t_{BR3}$ and/or $\Delta t_{BR4}$ of node 92b, respectively (e.g., as shown in FIG. 1A).

Node 92a may receive the sync information from node 92b (e.g., during "Rx" 92a-2 indicating that node's 92a receiver is activated to receive the sync information thereof) and may further determine, based on the sync information thereof and a predetermined synchronization protocol, a next transmitting time point to transmit next sync request to node 92b (e.g., as described above).

Typically, each node has a first clock drift with respect to at least one another node of the mesh network. The first clock drift between two respective nodes may be due to, for example, respective nodes internal clocks' inaccuracies. As a result, the sync request being sent by one of the nodes may miss the desired RX-Peek of the respective at least one node (e.g., determined by the receiving time point and the corresponding receiving time duration of the respective at least one another node). For example, the sync request being sent by node 92a at the first transmitting time point $t_{AT1}$ may miss, e.g., due to the first clock drift between the nodes thereof, the RX-Peek of node 92b determined by the corresponding receiving time point $t_{BR2}$ and the receiving time duration $\Delta t_{BR2}$ (e.g., as shown in FIG. 1B). Moreover, the first clock drift value between the respective nodes may change during the mesh network lifetime and/or may depend on environmental conditions being experienced by the nodes (e.g., ambient temperature). Thus, multiple synchronization loops are typically required during the mesh network lifetime to thereby maintain the synchronization between the mesh network nodes.

One way to maintain the synchronization between the mesh network nodes may include increasing the periodicity of the synchronization loops and/or increasing the receiving time durations of the mesh network nodes' receivers. However, this is expensive in the means of power consumption and/or network resources, as nodes may consume significantly more power when receiving data (or transmitting data) as compared to, for example, sleeping mode. For example, nodes may consume several micro-Watts in the sleeping mode, and tens or hundreds of milli-Watts when transmitting and/or receiving data.

Another way to maintain the synchronization between the mesh network nodes may include, for example, using accurate oscillators, e.g., atomic oscillators, in the nodes thereof. However, this may significantly increase the total cost of the mesh network, especially in the case of large mesh networks that may include hundreds or thousands of nodes.

Reference is now made to FIGS. 2A-2E, which are schematic illustrations of various configurations of a system 100 for synchronizing a mesh network 110, according to some embodiments of the invention.

System 100 may include a mesh network 110 and at least one back-end unit 120. Mesh network 110 may include a plurality of nodes 112. For example, mesh network 110 may include a first node 112a, a second node 112b, a third node 112c, a fourth node 112d and a fifth node 112e (e.g., as shown in FIGS. 2A-2E). It would be obvious to those skilled in the art that mesh network 110 may include any number of nodes (e.g., tens, hundreds and/or thousands of nodes). Each node of plurality of nodes may be associated with a respective clock value (e.g., determined by the internal clock of the respective node).

In some embodiments, mesh network 110 is a full mesh network, in which each node of plurality of nodes 112 directly (and non-hierarchically) communicates with all other nodes of plurality of nodes 112 (e.g., as shown in FIG.

2A). It is noted that the communication between the nodes is indicated in FIGS. 2A-2E by dashed arrows.

Figure 2A:
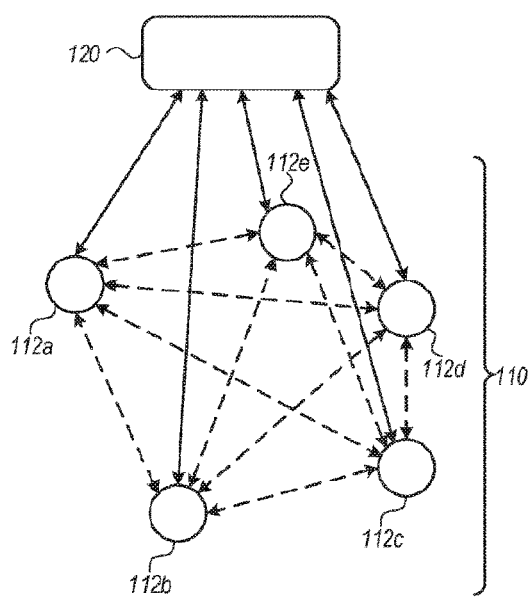
FIGS. 2A-2E are schematic illustrations of various configurations of a system for synchronizing a mesh network, according to some embodiments of the invention.
Figure 2B:
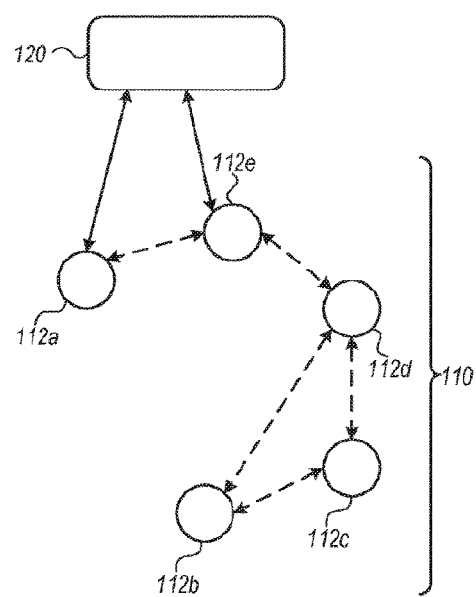
Figure 2C:
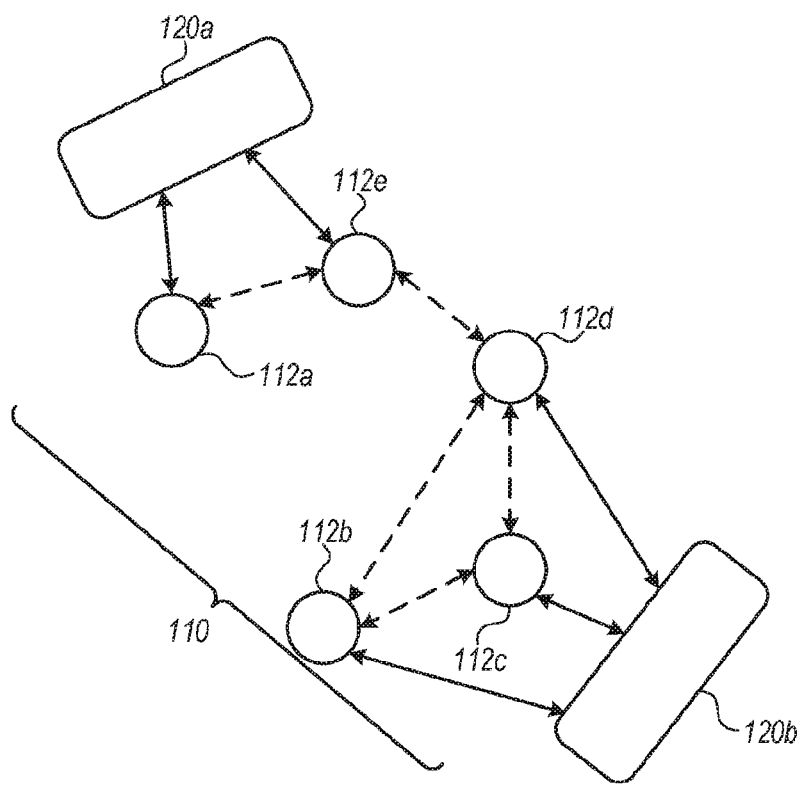
Figure 2D:
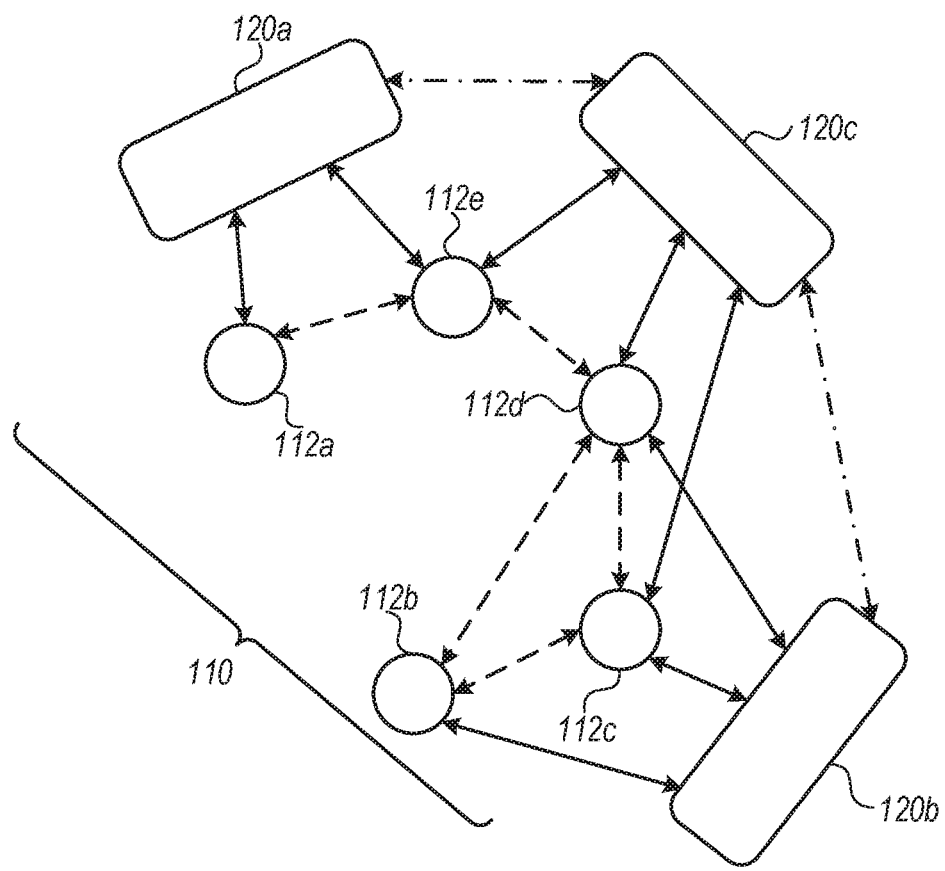

In some embodiments, mesh network 110 is a partial mesh network, in which each node of plurality of nodes 112 directly communicates with some other nodes of plurality of nodes 112 (e.g., as shown in FIGS. 2B-2D). For example, first node 112a may directly communicate with fifth node 112e and second node 112b may directly communicate with third node 112c and fourth node 112d (e.g., as shown in FIG. 2B). In some embodiments, at least some nodes of plurality of nodes 112 indirectly comminute with at least some other nodes of plurality of nodes. For example, second node 112b may indirectly communicate with first node 112a (e.g., through fourth node 112d and fifth node 112e). In another example, first node 112a may indirectly communicate with third node 112c (e.g., through fifth node 112e and fourth node 112d).

In some embodiments, each node of plurality of nodes 112 directly communicates with back-end unit 120 (e.g., as shown in FIG. 2A). It is noted that the communication between the nodes and back-end unit(s) 120 is indicated in FIGS. 2A-2E by solid-line arrows.

In some embodiments, at least some nodes of plurality of nodes 112 indirectly communicate with back-end unit 120 (e.g., through at least some other nodes of plurality of nodes 112). For example, second node 112b may indirectly communicate with back-end unit 120 through third node 112c, fourth node 112d and fifth node 112e (e.g., as shown in FIG. 2B).

In some embodiments, system 100 includes two or more back-end units 120. For example, system 100 may include a first back-end unit 120a and a second back-end unit 120b (e.g., as shown in FIG. 2C). In another example, system 100 may include first back-end unit 120a, second back-end unit 120b and a third back-end unit 120c (e.g., as shown in FIG. 2D).

In some embodiments, at least some nodes of plurality of nodes 112 directly communicate with one back-end unit of back-end unit(s) 120. For example, first node 112a and fifth node 112e may directly communicate with first back-end unit 120a, and second node 112b, third node 112c and fourth node 112d may directly communicate with second back-end unit 120b (e.g., as shown in FIG. 2C).

In some embodiments, at least some nodes of plurality of nodes 112 directly communicate with one or more back-end units 120. For example, fifth node 112e may directly communicate with first back-end unit 120a and with third back-end unit 120c (e.g., as shown in FIG. 2D). In another example, third node 112c may directly communicate with second back-end unit 120b and with third back-end unit 120c (e.g., as shown in FIG. 2D).

In some embodiments, at least some nodes of plurality of nodes 112 directly communicate with at least one back-end unit of back-end unit(s) 120 and indirectly communicate with at least one another back-end unit of back-end unit(s) 120. For example, second node 112b may directly communicate with second back-end unit 120b and indirectly communicate with third back-end unit 120c (e.g., through fourth node 112d) and further indirectly communicate with first back-end unit 120a (e.g., through fourth node 112d and fifth node 112e) (e.g., as shown in FIG. 2D).

In some embodiments, back-end units 120 may communicate (directly or indirectly) with each other. For example, third back-end unit 120c may directly communication with first back-end unit 120a and with second back-end unit 120b (e.g., as shown in FIG. 2D). It is noted that the communication between back-end units 120 is indicated in FIG. 2D by dashed-dotted arrows.

Communication (direct or indirect) of at least some nodes of plurality of nodes 112 with more than one back-end unit of back-end unit(s) 120 and/or communication (direct or indirect) between back-end units 120 may provide a backup in the case when one of the nodes and/or back-end units 120 fails. For example, referring to FIG. 2D as an example, in the case when first back-end unit 120a fails, first node 112a and fifth node 112e may still communicate (directly or indirectly, e.g., as described above with respect to FIG. 2D) with third back-end unit 120c and second back-end unit 120b to thereby ensure direct or indirect communication between all nodes 112 and/or back-end unit(s) 120 of mesh network 110.

In some embodiments, at least some nodes of plurality of nodes 112 are located in a specific location having predetermined environmental conditions. For example, first node 112a and second node 112b may be located in, for example, a temperature-stabilized environment 82 (e.g., air-conditioned room), while other nodes of mesh network 110 (e.g., third node 112c, fourth node 112d and fifth node 112e) may be located in, for example, an open terrain.

Figure 3A:
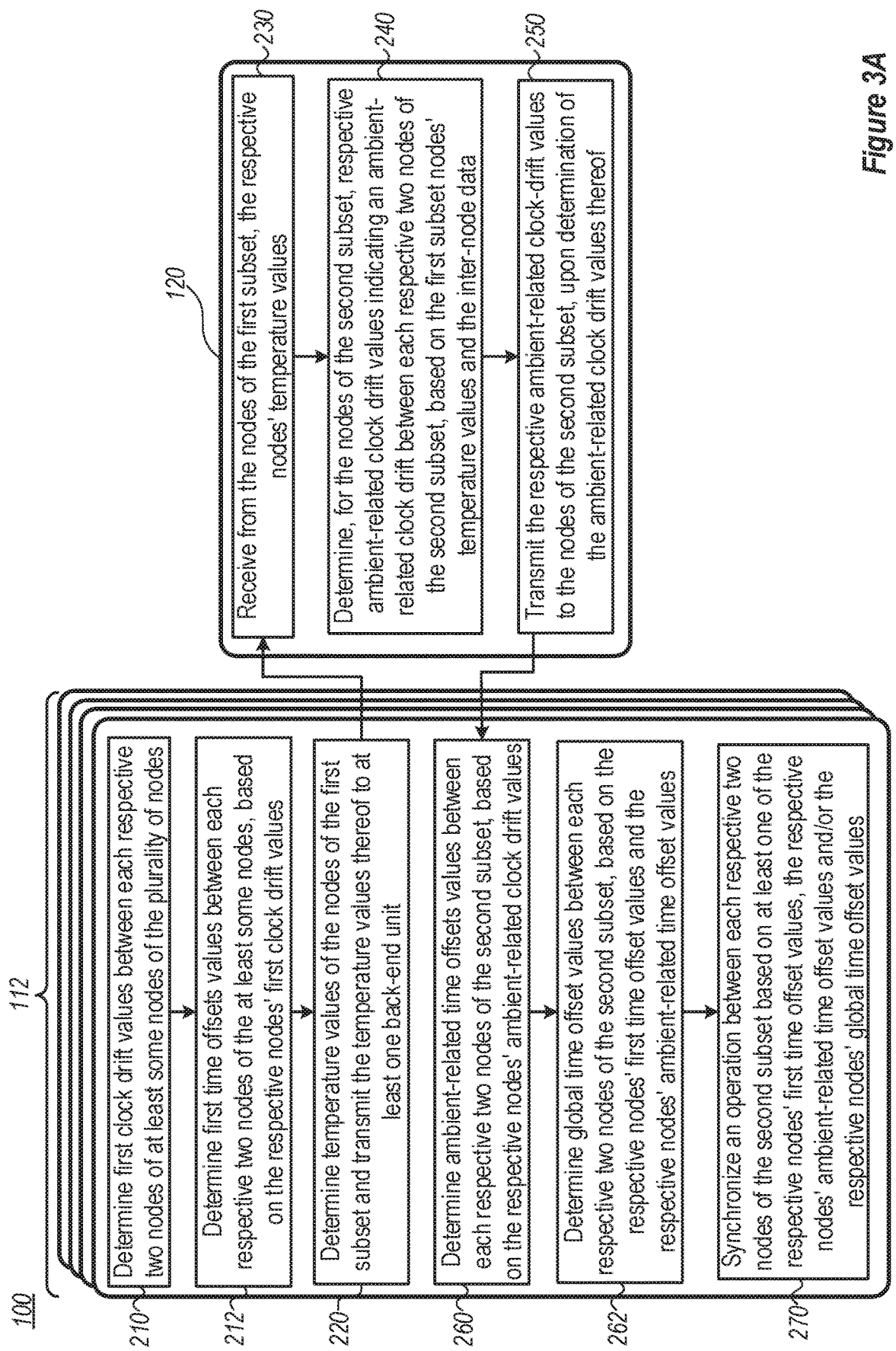
FIG. 3A is a flowchart of a method, performed by a system for synchronizing a mesh network, to determine time offsets values between at least some nodes of the mesh network, according to some embodiments of the invention.

Reference is now made to FIG. 3A, which is a flowchart of a method 200, performed by a system 100 for synchronizing a mesh network, to determine time offsets values between at least some nodes of the mesh network, according to some embodiments of the invention.

At least some nodes of plurality of nodes 112 may determine first clock drift values between each respective two nodes of the at least some nodes thereof (step 210) (e.g., as described below with respect to FIG. 3B).

The at least some nodes of plurality of nodes 112 may determine first time offsets values between each respective two nodes of the at least some nodes thereof, based on the respective nodes' first clock drift values (step 212) (e.g., as described below with respect to FIG. 3B).

In some embodiments, the first clock drift values thereof are determined only during a setup of mesh network 110. Optionally, the first clock drift values thereof may be determined (e.g., by the at least some nodes) periodically and/or according to a predetermined synchronization protocol during the lifetime of mesh network 110.

The at least some nodes may further synchronize an operation between each respective two nodes of the at least some nodes thereof, based on the respective nodes' first time offset values (e.g., as described below with respect to FIG. 3C).

In various embodiments, each node of the plurality of nodes determines, for each other node of plurality of nodes 112, a first clock drift value between the respective nodes; each node of plurality of nodes 112 determines, for each other node of plurality of nodes 112, a first time offset between the respective nodes, based on the first clock drift value between the respective nodes; and/or each node of plurality of nodes 112 synchronizes an operation of the respective node with each other node of plurality of nodes 112, based on the first time offset value between the respective nodes.

In some embodiments, the first clock drift values between each two nodes of at least some nodes of plurality of nodes 112 of mesh network 110 vary based on, for example, environmental conditions being experienced by the nodes. For example, the first clock drift values thereof may be based on the respective nodes' temperature values. In another example, the first clock drift values thereof may be based on ambient humidity. As a result, synchronization maintenance is required to ensure a synchronized operation between the mesh network nodes.

Current mesh networks will typically, increase the periodicity of the synchronization loops to update the first clock drift values between the mesh network nodes, and/or will increase the receiving time durations of the mesh network's receivers (e.g., as described above with respect to FIGS. 1A-1B). However, these are expensive in the means of power consumption and/or network resources, as nodes may consume significantly more power when receiving data (or transmitting data) as compared to, for example, sleeping mode.

System 100 may be arranged to determine ambient-related clock drift values (e.g., temperature-related clock drift values) between at least some nodes of plurality of nodes 112 and further to synchronize, based on the ambient-related clock drift values thereof (and optionally based on the first clock drift values), the operation between plurality of nodes 112 of mesh network 110 (e.g., as described below with respect to FIG. 3A-3E). As a result, system 100 may enable reducing to null the number of repeated synchronization loops (e.g., intended to update the first clock drift values between the mesh network nodes), to thereby significantly reduce the power being consumed by the mesh network nodes, and yet ensuring synchronized operation between the mesh network nodes thereof.

At least some nodes, e.g., a first subset of nodes, of plurality of nodes 112, may determine temperature values of the nodes of the first subset and further transmit the temperature values thereof to at least one of back-end units 120 (step 220).

Figure 2E:
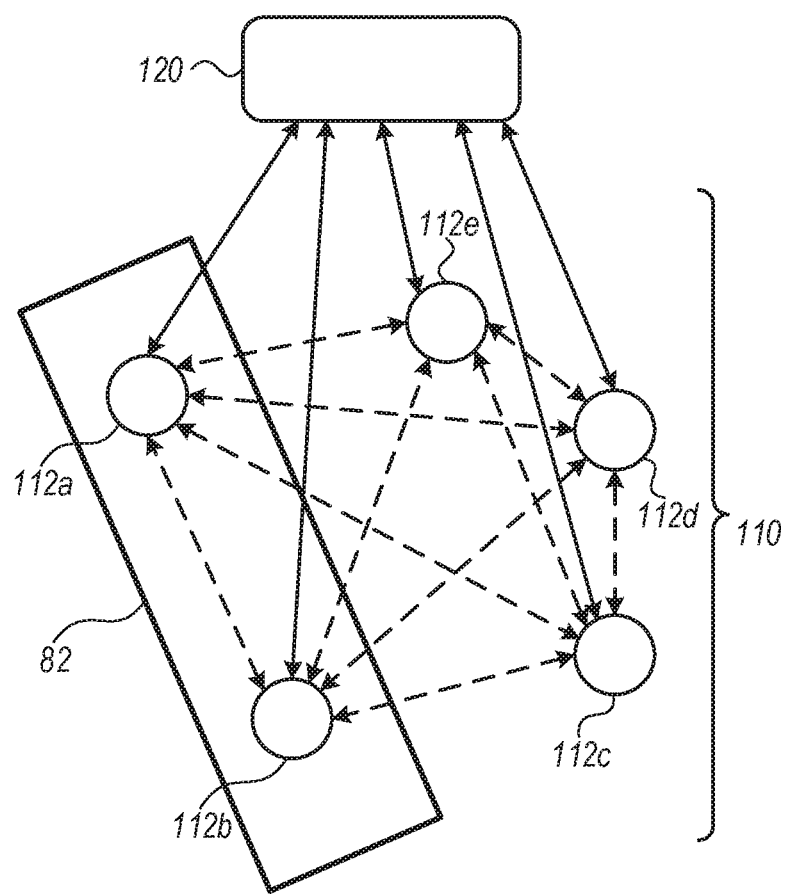

Referring to FIG. 2E as example, in which first node 112a and second node 112b are located in temperature-stabilized environment 82 (and thus are subjected to the same ambient temperature value) and third node 112c, fourth node 112d and fifth node 112e are located in the open terrain (and thus may be subjected to different ambient temperature values), the first subset may include first node 112a (or second node 112b), third node 112c, fourth node 112d and/or fifth node 112e. It may be sufficient that, for example, only first node 112a or second node 112b, will determine and transmit the respective node's temperature value to back-end unit(s) 120, as both first node 112a and second node 112b are subjected to the same ambient temperature value.

In some embodiments, the first subset includes all nodes of plurality of nodes 112. For example, in the case when all nodes of plurality of nodes are positioned in the open terrain such that each node of plurality of nodes 112 may experience different ambient temperature value, or the temperature values thereof may change with time, it may be required that each node of plurality of nodes 112 will determine and transmit the respective node's temperature value to back-end unit(s) 120.

Back-end unit(s) 120 may be arranged to receive, over mesh network 110, from the nodes of the first subset, the respective nodes' temperature values (step 230).

Back-end unit(s) 120 may include, or optionally obtain, inter-node data indicating inter-node relationship between the nodes of the first subset and a second subset of plurality of nodes 112 which includes at least some nodes of the first subset. The inter-node data thereof may, for example, include information concerning a physical location of the nodes of the first subset and the nodes of the second subset and/or the nodes of plurality of nodes 112.

Back-end unit(s) 120 may determine, for the nodes of the second subset, respective ambient-related clock drift values indicating an ambient-related clock drift between each respective two nodes of the second subset, based on the first subset nodes' temperature values and the inter-node data (step 240). In some embodiments, the second subset includes the nodes of the first subset and at least some other nodes of plurality of nodes 112. In some embodiments, the second subset includes all the nodes of plurality of nodes 112.

Referring to FIG. 2E as example, the second subset may include the nodes of the first subset (e.g., first node 112a, third node 112c, fourth node 112d and fifth node 112e) and further may include second node 112b. Back end-unit(s) 120 may determine the ambient-related clock drift values between: first node 112a and third node 112c; first node 112a and fourth node 112d; first node 112a and fifth node 112e; third node 112c and fourth node 112d; third node 112c and fifth node 112e and/or between fourth node 112d and fifth node 112e; based on the respective first subset nodes' temperature values. Back-end unit 120 may further determine the ambient-related clock drift values between second node 112b (e.g., which is not part of the first subset of nodes thereof) and each node of third node 112c, fourth node 112d and/or fifth node 112e, based on the first node's 112a temperature value (as both first node 112a and second node 112b are subjected to the same ambient temperature) and the third node's 112c temperature value, fourth node's 112d temperature value and/or fifth node's 112e temperature value, respectively. In some embodiments, the ambient-related clock drift values between second node 112b and each node of third node 112c, fourth node 112d and fifth node 112e will have the same values as corresponding ambient-related clock drift values between first node 112a and each node of third node 112c, fourth node 112d and fifth node 112e, respectively. In some embodiments, the ambient-related clock drift values thereof are determined (e.g., by back-end unit(s) 120) between each two nodes of the second subset nodes, based on the respective nodes' temperature values.

In another example, back-end unit(s) 120 may determine a first ambient-related clock drift value between third node 112c and fourth node 112d, a second ambient-related clock drift value between fourth node 112d and fifth node 112e, and further to determine, based on the first ambient-related clock drift value between third node 112c and fourth node 112d and the second ambient-related clock drift value between fourth node 112d and fifth node 112e, a third ambient-related clock drift value between third node 112c and fifth node 112e.

In some embodiments, back-end unit(s) 120 may be arranged to determine, for each node of the second subset, the respective node's ambient-related clock drift value, and further to determine, for each two nodes of the second subset, based on the respective nodes' ambient-related clock drift values, the ambient-related clock drift value between the respective nodes thereof.

Referring to FIG. 2E as example, back-end unit 120 may determine a fourth ambient-related clock drift value for fourth node 112d and a fifth ambient-related clock drift value for fifth node 112e and further to determine a sixth ambient-related clock drift value between fourth node 112d and fifth node 112e, based on the fourth ambient-related clock drift value and the fifth ambient-related clock drift value.

In some embodiments, back-end unit(s) 120 may be arranged to receive, from each node of the first subset, at each communication loop between the respective node and back-end unit 120, the respective nodes' temperature value and further to store the respective nodes' temperature value thereof (e.g., in a dedicated computer readable medium) to thereby generate a respective node's temperature values dataset.

For example, back-end unit 120 may be arranged to receive, from fourth node 112d, a first fourth node's temperature value $T_1$ at a first communication loop between fourth node 112d and back-end unit 120, and further receive a second fourth node's temperature value $T_2$ at a second communication loop. Back-end unit 120 may store the first fourth node's temperature value $T_1$ and the second fourth node's temperature value $T_2$ to thereby form a fourth's node temperature values dataset.

Back-end unit(s) 120 may be further arranged to determine the ambient-related clock drift value for each node of the second subset, based on least one temperature value of the respective node stored in the respective node's temperature values dataset, and based on a respective node's clock type. For example, Equation 1 shows the ambient-related clock drift value $C_{drift2}$ (e.g., in units of PPM) of fourth node 112d having a quartz-based crystals clock as follows:

$$C_{drift2} = 0.034 \cdot (T_1 - T_2)^2 \quad \text{(Equation 1)}$$

It is noted, that Equation 1 shows the ambient-related clock drift value for the quartz-based crystals clock and that other clock types may exhibit different ambient-related clock drift values.

In some embodiments, back-end unit(s) 120 is arranged to determine, for each node of the first subset, based on the respective node's temperature values dataset, a pattern of the respective node's temperature change.

Back-end unit(s) 120 may transmit the respective ambient-related clock-drift values, over mesh network 110, to the nodes of the second subset, upon determination of the ambient-related clock drift values thereof (step 250). In some embodiments, back-end unit(s) 120 is arranged to transmit the respective ambient-related clock-drift values to specific nodes only of the second subset, e.g., upon determination of the ambient-related clock drift values between the specific nodes thereof. For example, if no ambient-related clock drift values were determined between fourth node 112d and any one of first node 112a, second node 112b, third node 112c and fifth node 112e—no transmission between back-end unit 120 and fourth node 112d will be established to thereby reduce power consumption of fourth node 112d.

The nodes of the second subset may determine ambient-related time offsets values between each respective two nodes of the second subset, based on the respective nodes' ambient-related clock drift values (step 260). In some embodiments, the second subset nodes determine global time offset values between each respective two nodes of the second subset, based on the respective nodes' first time offset values and the respective nodes' ambient-related time offset values (step 262).

In various embodiments, the nodes of the second subset may synchronize an operation between each respective two nodes of the second subset based on at least one of the respective nodes' first time offset values, the respective nodes' ambient-related time offset values and/or the respective nodes' global time offset values (step 270) (e.g., as described below with respect to FIGS. 3C-3E).

In various embodiments, each node of plurality of nodes 112 determines a temperature value of the respective node and transmits the temperature value thereof to at least one back-end unit 120; at least one back-end unit 120 receives, from each node of plurality of nodes 112, the respective node's temperature value; at least one back-end unit 120 determines, for each node of plurality of nodes 112, and for each other node of plurality of nodes 112, a ambient-related clock drift value between the respective nodes thereof; at least one back-end unit 120 transmits to each node of plurality of nodes 112, the respective node's ambient-related clock drift values, upon determination of the ambient-related clock drift values thereof; each node of plurality of nodes 112 determines the ambient-related time offset values for each other node of plurality of nodes 112, based on respective nodes' ambient-related clock drift values; and/or each node of plurality of nodes 112 synchronizes an operation with each other node of plurality of nodes 112, based on at least one of the respective nodes' first time offset values and/or based on the respective nodes' ambient-related time offset values.

Figure 3B:
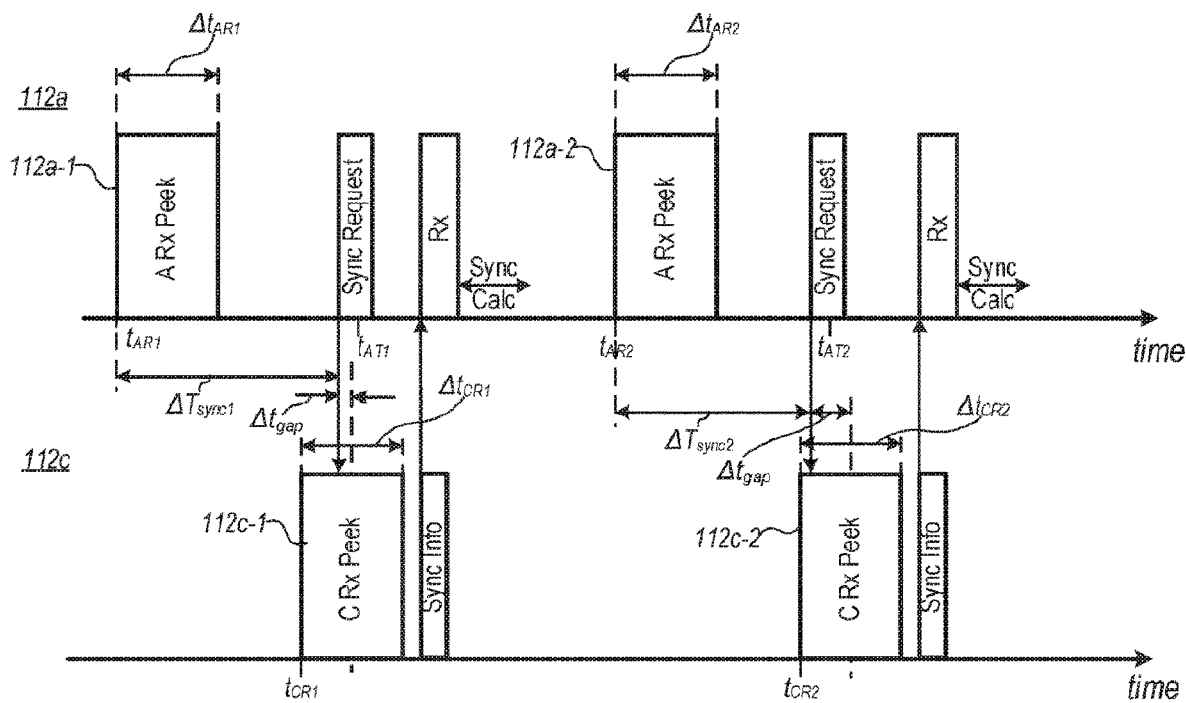
FIG. 3B is a graph illustrating functions performed by two nodes of a plurality of nodes of a mesh network to determine a first clock drift value and a first time offset value between the nodes thereof, according to some embodiments of the invention.

Reference is now made to FIG. 3B, which is a graph illustrating functions performed by two nodes of a plurality of nodes 112 of a mesh network 110, for example a first node 112a and a third node 112c, to determine a first clock drift value and a first time offset value between the nodes thereof, according to some embodiments of the invention.

It is noted that the functions illustrated in FIG. 3B for first node 112a and third node 112c may be performed, in various embodiments, between each two nodes of at least some nodes of plurality of nodes 112 (e.g., between the first subset nodes or the second subset nodes) and/or between each two nodes of plurality of nodes 112 (e.g., as described above with respect to FIG. 3A) to thereby determine the first clock drift values and/or the first time offset values between the respective nodes thereof.

According to some embodiments, mesh network nodes 112 are in a sleep mode when no communication and/or synchronization with other nodes of mesh network 110 and/or with back-end unit(s) 120 is required. In order to, for example, receive data from another node of plurality of nodes 112 and/or from back-end unit(s) 120, mesh network nodes 112 should activate respective nodes' receivers (or transceivers) at predetermined receiving time points and for predetermined receiving time durations.

For example, the activations of first node's 112a receiver are indicated in FIG. 3B as "A Rx-Peeks", e.g., a first "A Rx-Peek" 112a-1 and a second "A Rx-Peek" 112a-2, at corresponding predetermined receiving time points $t_{AR1}$, $t_{AR2}$, respectively, and having corresponding predetermined receiving time durations $\Delta t_{AR1}$, $\Delta t_{AR2}$, respectively. The activations of third node's 112c receiver are indicated in FIG. 3B as "C RX-Peeks", e.g., a first "C Rx-Peek" 112c-1 and a second "C Rx-Peek" 112c-2, at corresponding predetermined receiving time points $t_{CR1}$, $t_{CR2}$ and having corresponding predetermined receiving time durations $\Delta t_{CR1}$, $\Delta t_{CR2}$, respectively.

In some embodiments, at least some nodes of plurality of nodes 112 determine the first clock drift values between each two respective nodes of the at least some nodes based on the respective nodes' predetermined receiving time points and the respective nodes' predetermined receiving time durations. The information regarding the predetermined receiving time points and the predetermined receiving time durations of the at least some nodes thereof may be determined during, for example, a setup of mesh network 110 and/or during previous synchronization loop(s) between the respective nodes. The information thereof may be stored in, for example, the respective nodes' internal memory and/or in back-end unit(s) 120 of mesh network 110.

For example, first node 112a may determine, based on the predetermined receiving time point $t_{AR1}$ of first "A Rx-Peek" 112a-1 and based on the predetermined receiving time point $t_{CR1}$ and the corresponding predetermined receiving time duration $\Delta t_{CR1}$ of first "C RX-Peek" 112c-1 of third node 112c, a first time sync offset $\Delta T_{sync1}$ between the predetermined receiving time point $t_{AR1}$ and a first transmitting time point $t_{AT1}$ to transmit a sync request to third node 112c (e.g., as shown in FIG. 3B). Third node 112c may further transmit, upon reception of the sync request from first node 112a, a sync information to first node 112a. The sync information may include, for example, the predetermined receiving time point $t_{CR2}$ and corresponding predetermined receiving time duration $\Delta t_{CR2}$ of second "C Rx-Peek" 112c-2 of third node 112c.

The first time sync offset $\Delta T_{sync1}$, for example between the predetermined receiving time point $t_{AR1}$ of first "A Rx-Peek" 112a-1 and the first transmitting time point $t_{AT1}$ of first node 112a, may be determined to meet a middle of first "C Rx-Peek" 112c-1 of third node 112c (e.g., at $t=t_{CR1}+0.5 \cdot \Delta t_{CR1}$). It is noted that the middle of the "C Rx-Peeks" is selected as a reference time point only and that, in some embodiments, other reference time points may be selected. However, the first time sync offset $\Delta T_{sync1}$ may have a time gap $\Delta t_{gap}$ with respect to the middle of first "C Rx-Peek" 112c-1 of third node 112c, e.g., due to the first clock drift between first node 112a and third node 112c (e.g., as shown in FIG. 3B).

First node 112a may determine, upon reception of the sync information from third node 112c, based on the sync information thereof, a second time sync offset $\Delta T_{sync2}$ between the predetermined receiving time point $t_{AR2}$ of second "A Rx-Peek" 112a-2 and a second transmitting time point $t_{AT2}$ to transmit another sync request to third node 112c.

First node 112a may further determine, based on the first time sync offset $\Delta T_{sync1}$, the second time sync offset $\Delta T_{sync2}$ and a time difference between the second transmitting point $t_{AT2}$ and the first transmitting timepoint $t_{AT1}$ of first node 112a, a first clock drift value between first node 112a and third node 112c. For example, Equation 2 shows the first clock drift value $C_{drift1}$ between first node 112a and third node 112c as follows:

$$C_{drift1}=(\Delta T_{sync1}-\Delta T_{sync2})/(t_{AT2}-t_{AT1}) \quad \text{(Equation 2)}$$

First node 112a may further determine the first time offset $\Delta T_{offset1}$ between first node 112a and third node 112c based on the first clock drift value $C_{drift1}$ between first node 112a and third node 112c and based on an aging time $t_{aging}$ passed since the previous synchronization between first node 112a and third node 112c. For example, Equations 3 shows the first time offset $\Delta T_{offset1}$ between first node 112a and third node 112c as follows:

$$\Delta T_{offset1}=C_{drift1} \cdot t_{aging} \quad \text{(Equation 3)}$$

In various embodiments, the first time offset value has a positive value or a negative value.

Preferably, the calculations to determine the first time offset values between mesh network nodes 112 should be as simple as possible (e.g., as described above), as, in some embodiments, processing power of nodes 112 may be limited.

In some embodiments, at least some nodes of plurality of nodes 112 utilize CSMA/CD protocols, which require sending a Request to Send (RTS) and a Clear to Send (CTS) notifications prior to transmitting the data message between the at least some nodes thereof. In some embodiments, the at least some nodes' CTS notifications may include the sync request, thereby eliminating a need in transmitting separate sync requests between the at least some nodes thereof.

In some embodiments, the sync information being sent by, for example, third node 112c to, for example, first node 112a, may be also received by at least one another node of plurality of nodes 112. In this case, it may be required to generate generic sync information to thereby enable the at least one another node thereof to determine, based on the generic sync information, the first time offset between the at least one another node and, for example, third node 112c.

Figure 3C:
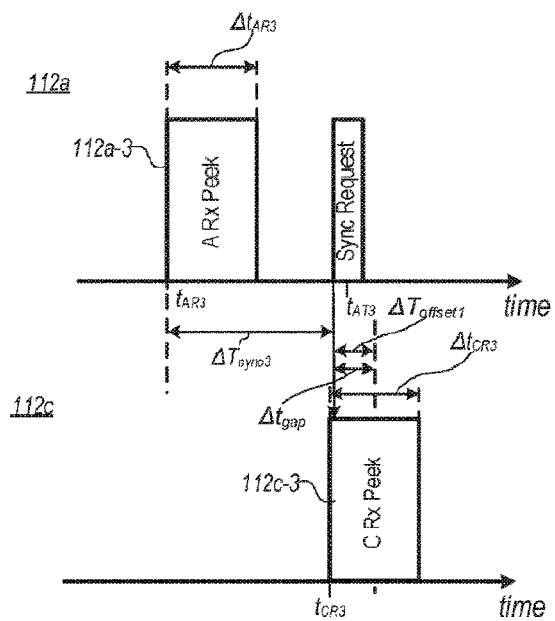
FIGS. 3C-3E are graphs illustrating synchronized operation between two nodes of a plurality of nodes of a mesh network, according to some embodiments of the invention.
Figure 3D:
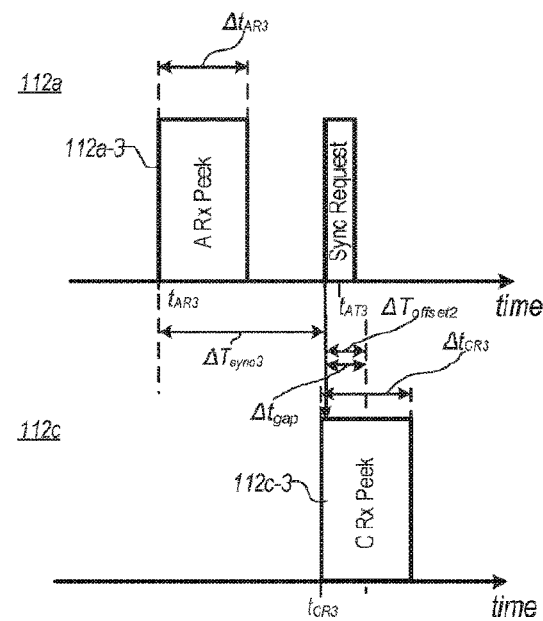
Figure 3E:
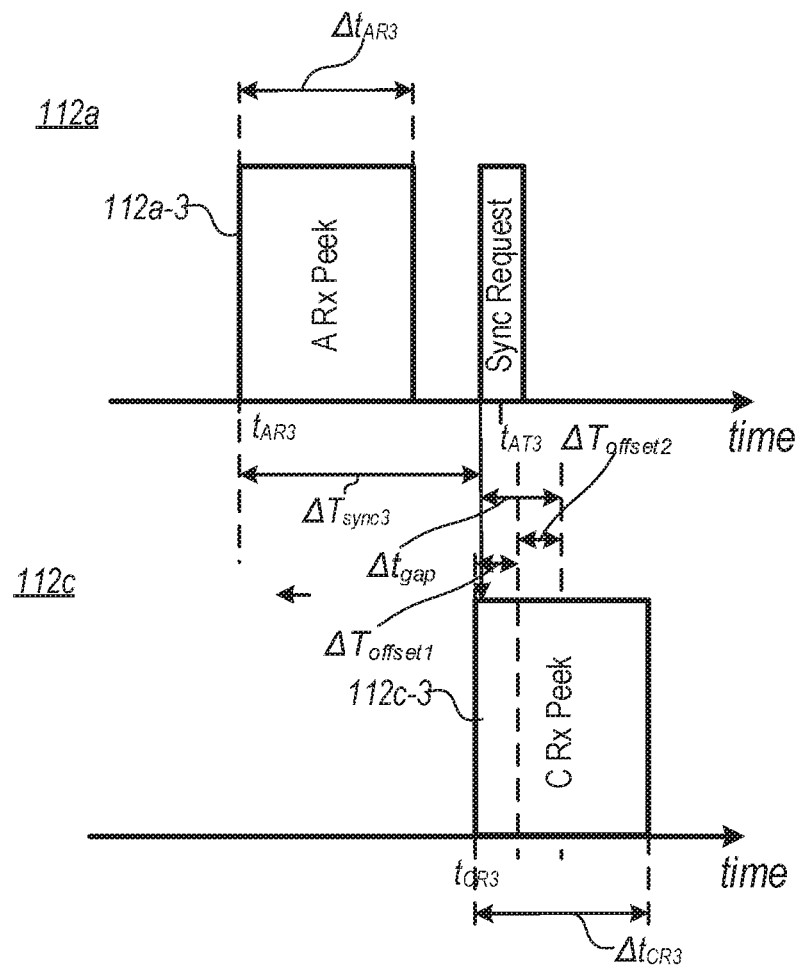

Reference is now made to FIGS. 3C-3E, which are graphs illustrating synchronized operation between two nodes of a plurality of nodes 112 of a mesh network 110, for example a first node 112a and a third node 112c, according to some embodiments of the invention.

It is noted that the functions illustrated in FIGS. 3C-3E for first node 112a and third nodes 112c may be performed, in various embodiments, between each two nodes of at least some nodes (e.g., the nodes of the first subset and/or the nodes of the second subset) of plurality of nodes 112 and/or between each two nodes of plurality of nodes 112 (e.g., as described above with respect to FIG. 3A) to thereby synchronize the operation between the respective nodes thereof.

In some embodiments, at least some nodes of plurality of nodes 112 may synchronize operations between each respective two nodes of the at least some nodes, based on the respective nodes' first time offsets (e.g., as described above with respect to FIG. 3A and FIG. 3B).

For example, first node 112a may synchronize the operation between first node 112a and third node 112c by adding the first time offset value $\Delta T_{offset1}$ between the nodes thereof to a third time sync offset $\Delta T_{sync3}$, to thereby compensate for a time gap $\Delta t_{gap}$ between a third "A Rx-Peek" 112a-3 of first node 112a and a third "C Rx-Peek" 112c-3 of third node 112c due to the first clock drift between the nodes thereof (e.g., as shown in FIG. 3C).

In some embodiments, at least some nodes of plurality of nodes 112 may synchronize operations between each respective two nodes of the at least some nodes thereof, based on the respective nodes' ambient-related time offsets (e.g., as described above with respect to FIG. 3A).

For example, first node 112a may synchronize the operation between first node 112a and third node 112c by adding the ambient-related time offset value $\Delta T_{offset2}$ (e.g., temperature-related time offset value) between the nodes thereof to the third time sync offset $\Delta T_{sync3}$, to thereby compensate for a time gap $\Delta t_{gap}$ between third "A Rx-Peek" 112a-3 of first node 112a and third "C Rx-Peek" 112c-3 of third node 112c due to the second clock drift (e.g., temperature-related clock drift) between the nodes thereof (e.g., as shown in FIG. 3D).

In some embodiments, at least some nodes of plurality of nodes 112 may synchronize operations between each respective two nodes of the at least some nodes thereof, based on the respective nodes' first time offsets and the ambient-related time offsets (e.g., as described above with respect to FIG. 3A).

For example, first node 112a may synchronize the operation between first node 112a and third node 112c by adding the first time offset value $\Delta T_{offset1}$ and the ambient-related time offset value $\Delta T_{offset2}$ between the nodes thereof to the third time sync offset $\Delta T_{sync3}$, to thereby compensate for a time gap $\Delta t_{gap}$ between third "A Rx-Peek" 112a-3 of first node 112a and third "C Rx-Peek" 112c-3 of third node 112c due to the first clock drift value and the second clock drift (e.g., temperature-related clock drift) between the nodes thereof (e.g., as shown in FIG. 3E).

Figure 4:
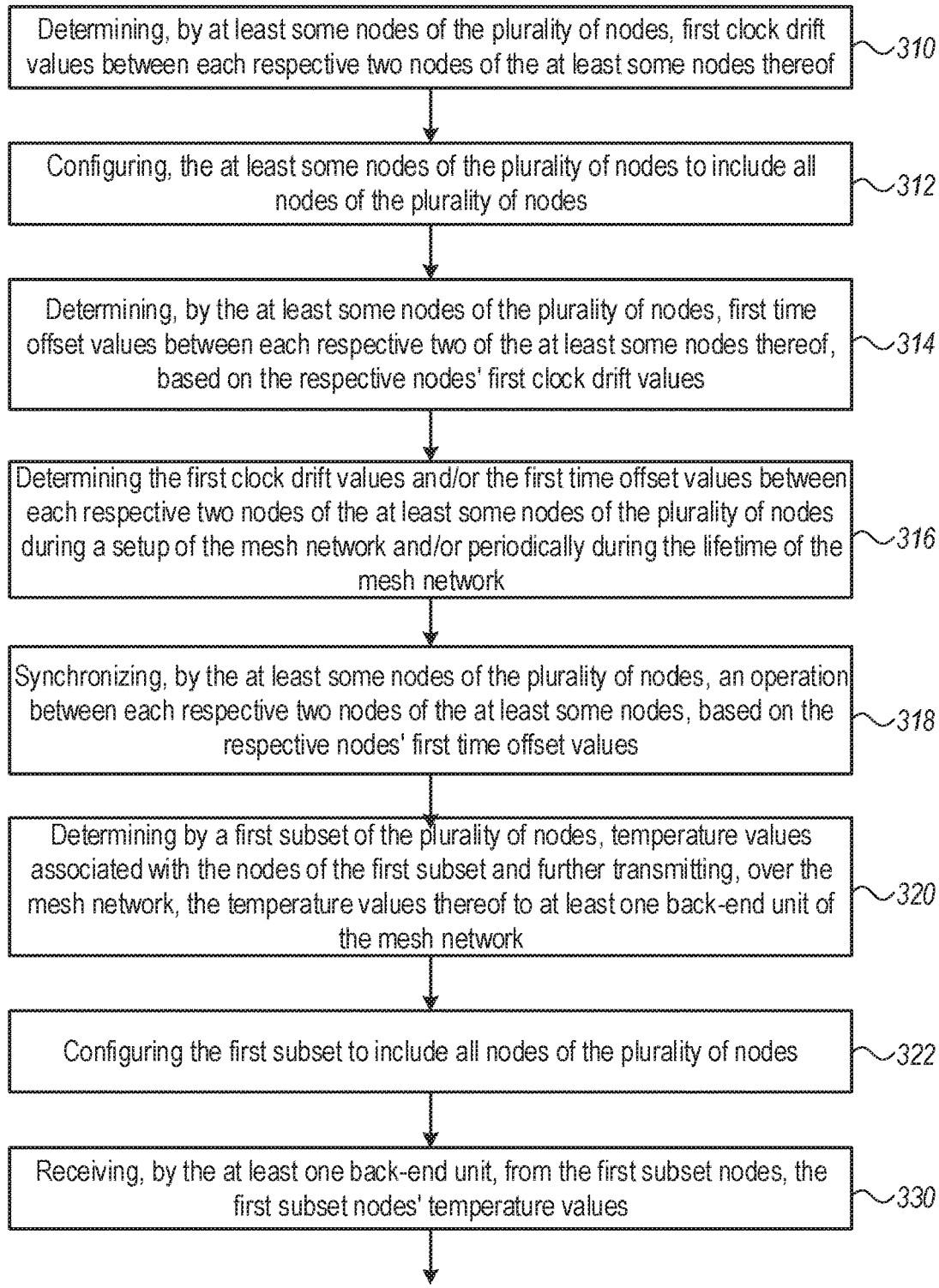
FIG. 4 is a flowchart of a method of synchronizing a mesh network comprising a plurality of nodes, according to some embodiments of the invention.

Reference is now made to FIG. 4, which is a flowchart of a method 300 of synchronizing a mesh network comprising a plurality of nodes, according to some embodiments of the invention.

Method 300 may be implemented by system 100 which may be arranged to implement method 300. It is noted that method 300 is not limited to the flowchart illustrated in FIG. 4 and to the corresponding description. For example, in various embodiments, method 300 needs not move through each illustrated box or stage, or in exactly the same order as illustrated and described.

According to some embodiments, the mesh network includes the plurality of interconnected nodes each associated with a respective clock value (e.g., as described above with respect to FIGS. 2A-2E).

Method 300 may include determining (step 310), by at least some nodes of the plurality of nodes, first clock drift values between each respective two nodes of the at least some nodes thereof (e.g., as described above with respect to FIGS. 3A-3B). In some embodiments, method 300 includes configuring (step 312) the at least some nodes of the plurality of nodes to include all nodes of the plurality of nodes.

Method 300 may include determining (step 314), by the at least some nodes of the plurality of nodes, first time offset values between each respective two of the at least some nodes thereof, based on the respective nodes' first clock drift values (e.g., as described above with respect to FIGS. 3A-3B).

In various embodiments, method 300 includes determining (step 316) the first clock drift values and/or the first time offset values between each respective two nodes of the at least some nodes of the plurality of nodes during a setup of the mesh network and/or periodically during the lifetime of the mesh network (e.g., as described above with respect to FIG. 3A).

Method 300 may include synchronizing (step 318), by the at least some nodes of the plurality of nodes, an operation between each respective two nodes of the at least some nodes, based on the respective nodes' first time offset values (e.g., as described below with respect to FIG. 3C).

Method 300 may include determining (step 320) by a first subset of the plurality of nodes, temperature values associated with the nodes of the first subset and further transmitting, over the mesh network, the temperature values thereof to at least one back-end unit of the mesh network (e.g., as described above with respect to FIG. 3A). In some embodiments, method 300 includes configuring (step 322) the first subset to include all nodes of the plurality of nodes.

Method 300 may include receiving (step 330), by the at least one back-end unit, from the first subset nodes, the first subset nodes' temperature values (e.g., as described above with respect to FIG. 3A).

Method 300 may include determining (step 340), by the at least one back-end unit, for a second subset of the plurality of nodes which includes at least some nodes of the first subset, respective ambient-related clock drift values indicating a clock drift between each respective two nodes of the second subset, based on the temperature values associated with the nodes of the first subset and an inter-node data indicating inter-node relationship between the nodes of the first subset and the nodes of the second subset (e.g., as described above with respect to FIG. 3A). In some embodiments, method 300 includes configuring (step 341) the second subset to include the first subset nodes and at least some other nodes of the plurality of nodes. In some embodiments, method 300 includes configuring (step 342) the second subset to include all the nodes of the plurality of nodes.

In some embodiments, method 300 includes determining (step 343), by the at least one back-end unit, for each node of the second subset, the respective node's ambient-related clock drift value and further determining, for each two nodes of the second subset, based on the respective nodes' ambient-related clock drift values, the ambient-related clock drift value between the respective nodes thereof.

In some embodiments, method 300 includes receiving (step 344), by the at least one back-end unit, from each node of the first subset nodes, at each communication loop between the respective node and the at least one back-end unit, the respective nodes' temperature value; storing the respective nodes' temperature value thereof (e.g., in a dedicated computer readable medium); and generating a respective node's temperature values dataset.

In some embodiments, method 300 includes determining (step 345), by the at least one back-end unit, the ambient-related clock drift value for each node of the second subset, based on least one temperature value of the respective node stored in the respective node's temperature values dataset, and based on a respective node's clock type.

In some embodiments, method 300 includes determining (step 346), by the at least one back-end unit, for each node of the first subset nodes, based on the respective node's temperature values dataset, a pattern of the respective node's temperature change.

Method 300 may include transmitting (step 350), by the at least one back-end unit, over the mesh network, the respective ambient-related clock drift values to the nodes of the second subset, upon determination of the ambient-related clock drift values thereof (e.g., as described above with respect to FIG. 3A).

Method 300 may include determining (step 360), by the nodes of the second subset, ambient-related time offset values between each respective two nodes of the second subset, based on the respective nodes' ambient-related clock drift values (e.g., as described above with respect to FIG. 3A). In some embodiments, method 300 includes determining (step 362), global time offsets values between each respective two nodes of the second subset, based on the respective nodes' first time offset values and the respective nodes' ambient-related time offset values (e.g., as described above with respect to FIG. 3A).

Method 300 may include synchronizing (step 370), by the nodes of the second subset, an operation between each respective two nodes of the second subset, by applying the ambient-related time offset between the respective nodes' to the respective nodes' clock value (e.g., as described above with respect to FIG. 3D).

Method 300 includes synchronizing (step 380), by the nodes of the second subset, an operation between each respective two nodes of the second subset, based on at least one of the respective nodes' first time offset values, the respective nodes' ambient-related time offset values or a combination thereof (e.g., as described above with respect to FIG. 3E).

In various embodiments, method 300 is implemented by/for each node of the plurality of nodes.

In various embodiments, method 300 includes at least some of the following stages: determining, by each node of the plurality of nodes, for each other node of the plurality of nodes, a first clock drift value between the respective nodes; determining, for each node of the plurality of nodes, a first time offset value between the respective nodes, based on the first clock drift value between the respective nodes; and/or synchronizing, by each node of the plurality of nodes, for each other node of the plurality of nodes, an operation between the respective nodes, based on the first time offset value between the respective nodes.

In various embodiments, method 300 includes at least some of the following stages: determining, by each node of the plurality of nodes, a temperature values of the respective node and transmitting the temperature value thereof to the at least one back-end unit; receiving, by the at least one back-end unit, from each node of the plurality of nodes, the respective node's temperature value; determining, by the at least one back-end unit, for each node of the plurality of nodes and for each other node of the plurality of nodes, a ambient-related clock drift value between the respective nodes, based on the temperature values of the respective nodes; determining, by each node of the plurality of nodes, for each other node of the plurality of nodes, a ambient-related time offset value between the respective nodes, based on the ambient-related clock drift value between the respective nodes; and/or synchronizing, by each node of the plurality of nodes, an operation with each other node of the plurality of nodes, based on the ambient-related time offset value between the respective nodes. In some embodiments, method 300 includes synchronizing, by each node of the plurality of nodes, an operation with each other node of the plurality of nodes, based on the first time offset and the ambient-related time offset value between the respective nodes.

Advantageously, the disclosed systems and methods may enable, in some embodiments, maintaining the synchronization between the mesh network nodes, simply by: monitoring mesh network nodes' temperature values, determining ambient-related clock drift values (e.g., temperature-related clock drift values) between the mesh network nodes and synchronizing an operation between the mesh network nodes based on the ambient-related clock drift values thereof (e.g., as described above with respect to FIGS. 3A-3E). As a result, the disclosed systems and methods may enable reducing to null the number of repeated synchronization loops intended to update the first clock drift values (e.g., due to clocks inaccuracies) between the mesh network nodes typically practiced in current mesh networks (e.g., as described above with respect to FIGS. 1A-1B), thereby significantly reducing the power being consumed by the mesh network nodes. Advantageously, the disclosed systems and methods do not require dedicated data transfers between the mesh network nodes and/or mesh network back-end, as the mesh network nodes' temperature values are typically transferred to the mesh network back-end units as a part of regular data traffic.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for synchronizing a mesh network, the system comprising:
a plurality of interconnected nodes forming a mesh network, wherein the nodes are each associated with a respective clock value, and wherein a first subset of the plurality of nodes is arranged to sense and transmit, over the mesh network, temperature values associated with the nodes of the first subset; and
at least one back-end unit arranged to:
receive, over the mesh network, the temperature values associated with the nodes of the first subset;
calculate, for a second subset of the plurality of nodes which includes at least some nodes of the first subset, respective ambient-related clock drift values indicating a clock drift between each respective two nodes of the second subset, based on the temperature values associated with the nodes of the first subset and an inter-node data indicating inter-node relationship between the nodes of the first subset and the nodes of the second subset; and
transmit the respective ambient-related clock drift values, over the mesh network, to the nodes of the second subset,
wherein the nodes of the second subset are arranged to determine ambient-related time offset values between each respective two nodes of the second subset, based on the respective nodes' ambient-related clock drift values.

2. The system of claim 1, wherein the nodes of the second subset are arranged to synchronize an operation between each respective two nodes of the second subset, by applying the ambient-related time offset between the respective nodes' to the respective nodes' clock value.

3. The system of claim 1, wherein the nodes of the second subset are arranged to determine first clock drift values between each respective two nodes of the second subset, and further arranged to determine, based on the respective nodes' first clock drift values, first time offset values between each respective two nodes of the second subset.

4. The system of claim 3, wherein the nodes of the second subset are arranged to synchronize the operation between each respective two nodes of the second subset, based on at least one of the respective nodes' first time offset values, the respective nodes' ambient-related time offset values or a combination thereof.

5. The system of claim 1, wherein the second subset further comprises at least some other nodes of the plurality of nodes.

6. The system of claim 1, wherein the second subset comprises all nodes of the plurality of nodes.

7. The system of claim 1, wherein the first subset comprises all nodes of the plurality of nodes.

8. The system of claim 1, wherein each node of the plurality of nodes directly communicates with each other node of the plurality of nodes.

9. The system of claim 1, wherein each node of the plurality of nodes directly communicates with some other nodes of the plurality of nodes and further indirectly communicates with remaining nodes of the plurality of nodes.

10. The system of claim 1, wherein each node of the plurality of nodes directly communicates with at least one back-end unit of the at least one back-end unit.

11. The system of claim 1, wherein some nodes of the plurality of nodes directly communicate with at least one back-end unit of the at least one back-end unit and wherein some other nodes of the plurality of nodes indirectly communicate with at least one back-end unit of the at least one back-end unit.

12. A method of synchronizing a plurality of interconnected nodes each associated with a respective clock value and forming a mesh network, the method comprising:
sensing and transmitting, by a first subset of the plurality nodes, over the mesh network, temperature values associated with the nodes of the first subset;
receiving, by at least one back-end unit, over the mesh network, from the nodes of the first subset, the temperature values associated with the nodes of the first subset;
determining, by the at least one back-end unit, for a second subset of the plurality of nodes which includes at least some nodes of the first subset, respective ambient-related clock drift values indicating a clock drift between each respective two nodes of the second subset, based on the temperature values associated with the nodes of the first subset and an inter-node data indicating inter-node relationship between the nodes of the first subset and the nodes of the second subset;
transmitting, by the at least one back-end unit, over the mesh network, the respective ambient-related clock drift values to the nodes of the second subset; and
determining, by the nodes of the second subset, ambient-related time offset values between each respective two nodes of the second subset, based on the respective nodes' ambient-related clock drift values.

13. The method of claim 12, further comprising synchronizing, by the nodes of the second subset, an operation between each respective two nodes of the second subset, by applying the ambient-related time offset between the respective nodes' to the respective nodes' clock value.

14. The method of claim 12, further comprising determining, by the nodes of the second subset, first clock drift values between each respective two nodes of the second subset, and further determining, based on the respective nodes' first clock drift values, first time offset values between each respective two nodes of the second subset.

15. The method of claim 14, further comprising synchronizing, by the nodes of the second subset, an operation between each respective two nodes of the second subset, based on at least one of the respective nodes' first time offset values, the respective nodes' ambient-related time offset values or a combination thereof.

16. The method of claim 12, further comprising configuring second subset to further comprise at least some other nodes of the plurality of nodes.

17. The method of claim 12, further comprising configuring the second subset to comprise all nodes of the plurality of nodes.

18. The method of claim 12, further comprising configuring the first subset to comprise all nodes of the plurality of nodes.

* * * * *